United States Patent
Koyama et al.

(10) Patent No.: US 6,692,821 B2
(45) Date of Patent: Feb. 17, 2004

(54) ACRYLIC RESIN LAMINATED FILM AND LAMINATED MOLDING USING THE SAME

(75) Inventors: Koji Koyama, Niihama (JP); Yoshio Tadokoro, Otsu (JP)

(73) Assignee: Sumitomo Chemical Company, Limited, Osaka (JP)

( * ) Notice: Subject to any disclaimer, the term of this patent is extended or adjusted under 35 U.S.C. 154(b) by 12 days.

(21) Appl. No.: 10/051,088

(22) Filed: Jan. 22, 2002

(65) Prior Publication Data

US 2002/0136853 A1 Sep. 26, 2002

(30) Foreign Application Priority Data

Jan. 24, 2001 (JP) .......................... 2001-016105

(51) Int. Cl.$^7$ .............................. B32B 7/02; B32B 27/30
(52) U.S. Cl. ................... 428/213; 428/195; 428/217; 428/327; 428/334; 428/335; 428/336; 428/520; 428/522
(58) Field of Search .................. 428/213, 217, 428/327, 334, 335, 336, 520, 522, 195

(56) References Cited

U.S. PATENT DOCUMENTS

| | | | |
|---|---|---|---|
| 3,793,402 A | 2/1974 | Owens et al. | |
| 5,804,287 A | 9/1998 | Hatakeyama et al. | ........ 428/220 |
| 6,147,162 A | 11/2000 | Tadokoro et al. | ............ 525/222 |
| 6,444,298 B1 * | 9/2002 | Tadokoro et al. | ............ 428/213 |

FOREIGN PATENT DOCUMENTS

| | | |
|---|---|---|
| DE | 100 10 466 A1 | 10/2000 |
| EP | 1 000 978 A1 | 7/1998 |

* cited by examiner

*Primary Examiner*—D. S. Nakarani
(74) *Attorney, Agent, or Firm*—Birch, Stewart, Kolasch & Birch, LLP

(57) ABSTRACT

The present invention provides an acrylic resin laminated film comprising a soft layer formed of an acrylic resin incorporated with rubber particles and having a flexural modulus of about 1,300 MPa or less, and a hard layer formed of an acrylic resin having a flexural modulus of about 1,800 MPa or more on at least one side of the soft layer, wherein the hard layer has a thickness of about 0.1 to about 30 μm and a ratio of the thickness of the hard layer to the overall thickness of the laminated film is about 50% or less. This acrylic resin laminated film has moderate surface hardness and flexibility and hence is capable of providing for a molding with less whitening when subjected to a molding or forming process including bending or stretching.

9 Claims, 1 Drawing Sheet

ACRYLIC RESIN LAMINATED FILM AND LAMINATED MOLDING USING THE SAME

BACKGROUND OF THE INVENTION

1. Field of the Invention

The present invention relates to an acrylic resin laminated film, which resists whitening when subjected to a molding process and is excellent in surface hardness and flexibility, and to a laminated molding using the same.

2. Description of the Related Art

Acrylic resins are excellent in transparency, translucency, surface gloss and weather resistance and further have a high surface hardness and a superior design adaptability and hence find a wide variety of applications in interior materials for vehicles, exterior materials for household electrical appliances and building materials (exterior) for example, regardless of whether they are outdoor or indoor applications. However, acrylic resins generally exhibit poor flexibility and low impact resistance and therefore involve a problem that they are prone to fracture when given an extraneous load or impact. Accordingly, attempts are being made to impart flexibility to such an acrylic resin with its characteristics, such as transparency and surface gloss, maintained as they are by incorporating rubber particles into the acrylic resin. Depending upon the type or amount of such rubber particles incorporated to impart flexibility, there may be a case where the resulting acrylic resin does not have a sufficient surface hardness or where whitening of the acrylic resin takes place due to bending or stretching involved in a molding or forming process. Consequently, the inherent characteristics of the acrylic resin such as transparency, translucency, surface gloss, surface hardness and design adaptability are impaired, which undesirably brings a hindrance in the aforementioned applications such as interior or exterior materials and building materials.

SUMMARY OF THE INVENTION

The inventors of the present invention have made an intensive study in pursuit of developing an acrylic resin material that resists to whitening due to bending or stretching during a molding or forming process while maintaining flexibility.

As a result, they have found that, by combining a layer having a flexural modulus of about 1,300 MPa or less with a layer having a flexural modulus of about 1,800 MPa or more, it is possible to attain such an objective. Thus, the present invention has been accomplished.

That is, the present invention provides an acrylic resin laminated film comprising a soft layer formed of an acrylic resin incorporated with rubber particle and having a flexural modulus of about 1,300 MPa or less, and a hard layer formed of an acrylic resin having a flexural modulus of about 1,800 MPa or more on at least one side of the soft layer, wherein the hard layer has a thickness of about 0.1 to about 30 $\mu$m and the ratio of the thickness of the hard layer to the overall thickness of the laminated film is about 50% or less.

This acrylic resin laminated film may be molded integrally with a thermoplastic resin into a laminated molding so that the hard layer thereof forms an outermost layer of the laminated molding. The laminated film has moderate surface hardness and flexibility and hence is capable of providing for a molding with less whitening when subjected to a molding process including bending or stretching. Further, when this acrylic resin laminated film may be laminated with other thermoplastic resin film and the resulting laminated film may be molded integrally with a thermoplastic resin into a laminated molding so that the hard layer thereof forms an outermost layer of the laminated molding, the resulting laminated film has moderate surface hardness and flexibility and hence is capable of providing for a molding with less whitening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF THE PREFERRED EMBODIMENTS

Figure 1:
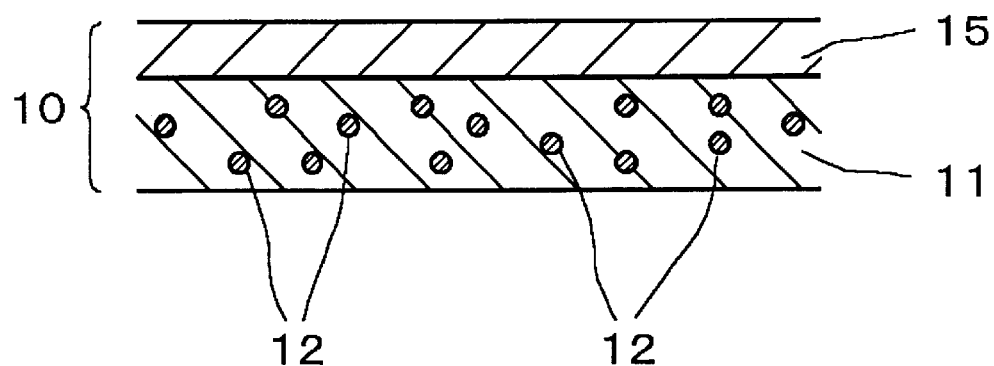
FIG. 1 is a schematic sectional view showing an embodiment of an acrylic resin laminated film according to the present invention.
Figure 2:
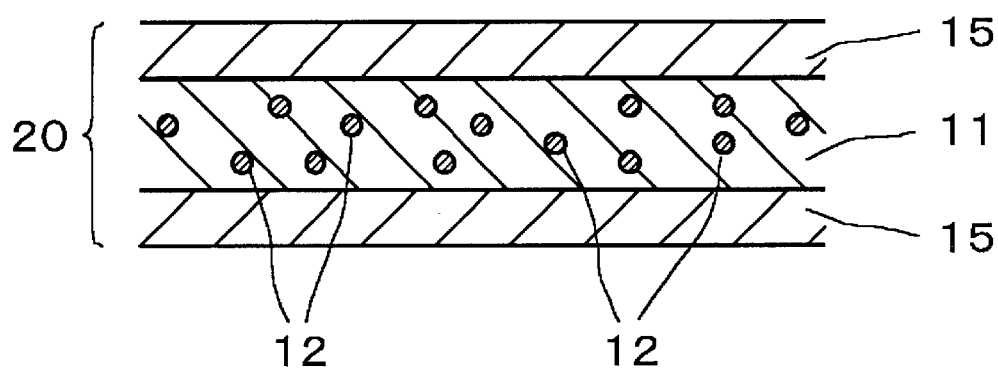
FIG. 2 is a schematic sectional view showing another embodiment of an acrylic resin laminated film according to the present invention.

FIGS. 1 and 2 are schematic sectional views showing acrylic resin laminated films embodying the present invention. According to the present invention, a soft layer 11 contains rubber particles 12 and is formed with a hard layer 15 on at least one side thereof. FIG. 1 shows a laminated film 10 in which soft layer 11 is formed with hard layer 15 on one side thereof, while FIG. 2 shows a laminated film 20 in which soft layer 11 is formed with hard layers 15 on both sides thereof.

The soft layer 11 is formed of an acrylic resin incorporated with rubber particles 12 and having a flexural modulus of about 1,300 MPa or less, preferably about 1,000 MPa or less, in terms of flexibility. If the flexural modulus of the soft layer 11 becomes larger than the value specified above, the soft layer 11 has poor flexibility so that the laminated film including the same exhibits a lowered handling property. The flexural modulus, as used herein, is a value measured according to JIS K 7171.

Rubber particles 12 incorporated in the acrylic resin forming the soft layer 11 may be of any type of particles, which can realize the aforementioned flexural modulus but are preferably of an acrylic type. Acrylic rubber particles having a double- or triple-layered structure (hereinafter, referred to double-layered acrylic rubber particles or triple-layered acrylic rubber particles) are preferably used.

Such a double-layered acrylic rubber particle is, for example, a rubber particle obtained by the steps of: forming an inner layer formed of a rubber elastic material resulting from copolymerizatin of an alkyl acrylate having $C_4$ to $C_8$ alkyl, a polyfunctional monomer and optionally other monofunctional mononer; and then forming an outer layer formed of a hard polymer resulting from polymerization of a monomer comprising methyl methacrylate a major component.

The polyfunctional monomer used here is a compound having at least two polymerizable carbon—carbon double bonds per molecule. Examples of such compounds include alkenyl esters of unsaturated carboxylic acids such as allyl (meth)acrylate and methallyl (meth)acrylate; dialkenyl esters of dibasic acids such as diallyl maleate; and unsaturated carboxylic acid diesters of glycols such as alkylene glycol di(meth)acrylate. Examples of other monofunctional monomer optionally used as a copolymerization component include styrene, nuclear-substituted alkyl styrene, á-methylstyrene, and acrylonitrile.

Such a triple-layered acrylic rubber particle is, for example, a rubber particle comprising an innermost layer formed of a hard polymer comprising methyl methacrylate as a major component, an intermediate layer formed of a rubber elastic material resulting from copolymerization of an alkyl acrylate having $C_4$ to $C_8$ alkyl, a polyfunctional monomer and optionally other monofunctional mononer, and an outermost layer formed of a hard polymer comprising methyl methacrylate as a major component. The polyfunctional monomer used here is a compound having at least two polymerizable carbon—carbon double bonds per molecule. Examples of such compounds include alkenyl esters of unsaturated carboxylic acids such as allyl (meth)acrylate and methallyl (meth) acrylate; dialkenyl esters of dibasic acids such as diallyl maleate; and unsaturated carboxylic acid diesters of glycols such as alkylene glycol di(meth)acrylate. Examples of other monofunctional monomer optionally used as a copolymerization component include styrene, nuclear-substituted alkyl styrene, á-methylstyrene, and acrylonitrile. Such a triple-layered rubber particle can be prepared according to the method described in Japanese Examined Patent Gazette No. SHO 55-27576 for example.

A double-layered acrylic rubber particle as described above is preferably used in the present invention because the flexural modulus of the acrylic resin can be adjusted with a relatively small amount of such rubber particles.

The acrylic resin forming the soft layer 11 may be prepared by, for example, a process including providing double- or triple-layered acrylic rubber particles in the manner described above and then polymerizing a monomer comprising alkyl methacrylate as a major component to give a resin matrix incorporated with the rubber particles; or a process including melt-kneading rubber particles obtained in the same manner as above together with an acrylic resin free of any rubber component. The polymerized product of such a monomer comprising an alkyl methacrylate as a major component or the acrylic resin free of any rubber component may be poly alkyl methacrylate which is a homopolymer of an alkyl methacrylate, a copolymer of an alkyl methacrylate and an alkyl acrylate, or a like polymer. The alkyl methacrylate used is one having about $C_1$ to about $C_4$ alkyl. Among such alkyl methacrylates, methyl methacrylate is particularly preferable. If an alkyl acrylate is used as a copolymerization component, such an alkyl acrylate has about $C_1$ to about $C_8$ alkyl. In the case of the copolymer, it is preferred that the proportions of an alkyl methacrylate unit and an alkyl acrylate unit in the copolymer assume about 50% to about 99% by weight and about 50% to about 1% by weight, respectively.

Since the outer layer of such a rubber particle incorporated in the acrylic resin is miscible with the matrix resin, a section of the rubber particle is observed as a single- or double-layered particle with no outermost layer by electron microscopy in which the rubber component of the acrylic resin is dyed with ruthenium oxide. The average particle diameter of double-layered rubber particles observed using an electron microscope is usually about 10 to about 200 nm. It is difficult to prepare such rubber particles having a very small particle diameter. If the particle diameter of the rubber particles becomes too large, whitening is likely when the resulting laminated film is subjected to molding or forming. The average particle diameter of triple-layered rubber particles observed using an electron microscope is usually about 100 to about 350 nm. The average particle diameter, as used herein, is a value measured by electron microscopy, in which the outer layer is not observed.

The flexural modulus of the soft layer 11 varies depending upon the composition of the resin matrix, the type, composition or particle diameter of the rubber particles used, or like factors. Soft layer 11 with a matrix resin formed of a copolymer of methyl methacrylate and an alkyl acrylate has a lower flexural modulus than that with a matrix resin formed of 100% by weight of methyl methacrylate. Since double-layered rubber particles have a lower flexural modulus than triple-layered rubber particles, a less amount of such double-layered rubber particles is generally sufficient to decrease the flexural modulus of the soft layer. The soft layer formed of an acrylic resin having a flexural modulus of about 1,300 MPa or less is provided by appropriately selecting the matrix resin and the type and the amount of rubber particles. If, for example, an acrylic resin comprising 80% by weight of methyl methacrylate and 20% by weight of butyl acrylate and the aforementioned double-layered rubber particles (particle diameter: about 75 nm) are used, adjustment of the content of the double-layered rubber particles to about 40% by weight or more makes it possible adjust the flexural modulus of the resulting soft layer to about 1,300 MPa or less. If an acrylic resin comprising 100% by weight of methyl methacrylate is used, adjustment of the content of the double-layered rubber particles to about 60% by weight or more makes it possible to adjust the flexural modulus of the resulting soft layer to about 1,300 MPa or less. In the case where triple-layered rubber particles are used, the amount of the triple-layered rubber particles has to be greater than the amount of the double-layered rubber particles used in the former cases. As required, triple-layered rubber particles each having a smaller particle diameter or a larger proportion of the intermediate layer consisting of a rubber elastic material are used.

The hard layer 15, on the other hand, is formed of an acrylic resin having a flexural modulus of about 1,800 MPa or more in view of surface hardness. Since the aforementioned interior or exterior materials are generally required to have a pencil hardness of B or more (B or more harder) at surface, it is preferred that the hard layer 15 of the acrylic resin laminated film according to the present invention also have a pencil hardness of B or more. The pencil hardness is represented by a pencil scratch value measured according to JIS K 5400. If the flexural modulus of the hard layer 15 is about 1,800 MPa or more, a pencil hardness of B or more can be realized, whereas if it is less than about 1,800 MPa, the hard layer 15 has a pencil hardness of softer than B, which cannot ensure a sufficient surface hardness. Preferably, the flexural modulus of the hard layer 15 is about 2,500 MPa or more. The pencil hardness of the hard layer 15 is preferably HB or more, more preferably H or more.

Examples of acrylic resins usable to form the hard layer 15 include poly alkyl methacrylate which is a homopolymer of alkyl methacrylate, and a copolymer of alkyl methacrylate and alkyl acrylate. The alkyl methacrylate used here is one having about $C_1$ to about $C_4$ alkyl. Among such alkyl ester methacrylates, methyl methacrylate is particularly preferable. If an alkyl ester acrylate is used as a copolymerization component, such an alkyl ester acrylate has about $C_1$ to about $C_8$ alkyl. In the case of the copolymer, it is preferred that the proportions of an alkyl methacrylate unit and an alkyl acrylate unit in the copolymer assume about 50% to about 99% by weight and about 50% to about 1% by weight, respectively. Each of these resins usually has a flexural modulus of about 1,800 MPa or more.

Though the hard layer 15 may be incorporated with the aforementioned triple-layered acrylic polymer to impart the resulting laminated film with flexibility and workability, it is preferred that the hard layer 15 be formed of an acrylic resin substantially free of any rubber elastic material from the viewpoint attaching importance to prevention of whitening during molding.

The amount of such triple-layered acrylic rubber particles if incorporated in the hard layer 15 depends upon the composition thereof or the like. For example, if the acrylic resin of the hard layer 15 comprises 80% by weight of methyl methacrylate and 20% by weight of butyl acrylate, the amount of the triple-layered acrylic rubber particles is about 60% by weight or less, preferably about 25% by weight or less, based on the total amount of the acrylic resin forming the hard layer 15 inclusive of the triple-layered acrylic rubber particles. If the acrylic resin of the hard layer 15 comprises 100% by weight of methyl methacrylate, the amount of the triple-layered acrylic rubber particles is about 80% by weight or less. When the triple-layered acrylic rubber particles are incorporated too much, a difficulty arises in inhibiting the occurrence of whitening during molding or forming despite an improvement in the flexibility of the laminated film. The amount of the triple-layered acrylic rubber particles if used in the hard layer is usually 0.1% by weight or more.

The hard layer 15 has a thickness of about 0.1 to about 30 $\mu$m, while, at the same time, the ratio of the thickness of the hard layer 15 to the overall thickness of the laminated film 10 or 20 is about 50% or less. More preferably, the thickness of the hard layer 15 is about 1 to about 15 $\mu$m, and the ratio of the thickness of the hard layer 15 to the overall thickness of the laminated film 10 or 20 is about 20% or less. By adjusting the ratio of the thickness of the hard layer 15 to the overall thickness of the laminated film 10 or 20 to a relatively low ratio, it is possible to maintain the flexibility imparted by the soft layer 11 as well as to inhibit the occurrence of whitening during molding or forming. Further, by adjusting the thickness of the hard layer 15 to at least about 0.1 $\mu$m, it is possible to improve the surface hardness of the resulting laminated film. If the thickness of the hard layer 15 is more than 30 $\mu$m, the resulting laminated film exhibits lowered flexibility or tends to suffer from increased whitening during molding or forming. If it is less than about 0.1 $\mu$m, the resulting laminated film has a lowered surface hardness. If the ratio of the thickness of the hard layer 15 to the overall thickness of the acrylic resin laminated film becomes higher than about 50%, the flexibility imparted by the soft layer 11 is impaired, so that the handling property of the resulting laminated film, as a whole, tends to lower.

In the present invention, as described above, the acrylic resin having a flexural modulus of about 1,300 MPa or less is formed into the soft layer 11, while the acrylic resin having a flexural modulus of about 1,800 MPa or more is formed into the hard layer 15. The difference in flexural modulus between the two layers is preferably large to a certain degree, for example about 800 MPa or more, more preferably about 1,000 MPa or more.

The laminated film usually has a structure such that the hard layer 15 is laminated on one side of the soft layer 11 as shown in FIG. 1. When desired, it is possible to provide hard layers 15, 15 on both sides of the soft layer 11. In this case, the thickness of the hard layer specified above is the total thickness of the layers 15, 15.

The respective acrylic resin layers forming the soft layer 11 and the hard layer 15 may contain typical additives such as an ultraviolet absorber, organic dye, inorganic dye, pigment, antioxidant, antistatic agent, and surface active agent. Among them, the ultraviolet absorber is preferably used because it provides for a laminated molding exhibiting superior weather resistance for a long time. Such ultraviolet absorbers include, for example, typical ultraviolet absorbers such as benzotriazole ultraviolet absorbers, 2-hydroxybenzophenone ultraviolet absorbers, salicylic acid phenyl ester ultraviolet absorbers. Examples of specific benzotriazole ultraviolet absorbers include 2,2'-methylenebis[4-(1,1,3,3-tetramethylbutyl)-6-(2H-benzotriazole-2-yl)phenol], 2-(5-methyl-2-hydroxyphenyl)benzotriazole, 2-[2-hydroxy-3,5-bis(á, á-dimethylbenzyl)phenyl]-2H-benzotriazole, 2-(3,5-di-tert-butyl-2-hydroxyphenyl)benzotriazole, 2-(3-tert-butyl-5-methyl-2-hydroxyphenyl)-5-chlorobenzothiazole, 2-(3,5-di-tert-butyl-2-hydroxyphenyl)-5-chlorobenzothiazole, 2-(3,5-di-tert-amyl-2-hydroxyphenyl)benzotriazole, and 2-(2'-hydroxy-5'-tert-octylphenyl)benzotriazole. Examples of specific 2-hydroxybenzophenone ultraviolet absorbers include 2-hydroxy-4-methoxybenzophenone, 2-hydroxy-4-octoxybenzophenone, 2,4-dihydroxybenzophenone, 2-hydroxy-4-methoxy-4'-chlorobenzophenone, 2,2'-dihydroxy-4-methoxybenzophenone, and 2,2'-dihydroxy-4,4'-dimethoxybenzophenone. Examples of specific salicylic acid phenyl ester ultraviolet absorbers include p-tert-butylphenyl salicylate, and p-octylphenyl salicylate.

These ultraviolet absorbers may be used either alone or as mixtures. The amount of such an ultraviolet absorber if used is usually about 0.1 parts by weight or more, preferably about 0.3 parts by weight or more and about 2 parts by weight or less, based on 100 parts by weight of the acrylic resin composition including the rubber particles.

The acrylic resin laminated film of the present invention preferably has an overall thickness of about 60 to about 800 $\mu$m. The laminated film may be prepared by any one of the following exemplary processes: i.e. a process comprising separately forming the acrylic resin that will form the soft layer 11 and the acrylic resin that will form the hard layer 15 into sheets or films and then continuously laminating such sheets or films together by passing them through heated rolls; a process comprising thermocompression bonding using a press; a process comprising lamination at the same time with air-pressure forming or vacuum forming; a process comprising lamination using an intervening adhesive layer (wet lamination); a process comprising a co-extrusion process for co-extruding the acrylic resin that will form the soft layer 11 and the acrylic resin that will form the hard layer 15 and bringing the both sides of the resulting extruded body into contact with roll surfaces or metal belt surfaces to form a sheet or film; and a process comprising laminating an acrylic resin base previously formed into a sheet or film that will form the soft layer 11 or the hard layer 15 with the acrylic resin melt-extruded from a T-die that will form the other layer. In previously forming each of the acrylic resins into a sheet or film it is preferable that the extruded body of each resin melt-extruded from a T-die for example is brought into contact with roll surfaces or metal belt surfaces at both sides thereof to form a sheet or film. One acrylic resin thus formed into a sheet or film may be subjected to a corona discharge treatment for example or formed with an adhesive layer on the side to be laminated with the counterpart acrylic resin base. Such a sheet or film thus formed may be printed with a pattern or image.

The acrylic resin laminated film of the present invention is positioned to form the outermost surface layer of a molding when molded integrally with another thermoplastic resin for example. In this case, the laminated film is preferably positioned so that the hard layer 15 thereof becomes the outermost layer. It is also effective that the acrylic resin laminated film is printed with a pattern or image on at least one side thereof and then molded integrally with another thermoplastic resin. To provide the printed pattern or image with profundity, it is preferred that the laminated film be printed on the side to contact the other thermoplastic resin, specifically on the soft layer 11 side if the laminated film is double-layered as shown in FIG. 1 or on one side if the laminated film is triple-layered as shown in FIG. 2.

The laminated film may be molded integrally with another thermoplastic resin by any one of the following exemplary processes: i.e. a process comprising separately forming the acrylic resin laminated film and the thermoplastic resin into sheets or films and then continuously laminating such sheets or films together bypassing them through heated rolls; a process comprising thermocompression bonding using a press; a process comprising lamination at the same time with air-pressure forming or vacuum forming; a process comprising lamination using an intervening adhesive layer (wet lamination); an insert molding process or thermoforming process using a multi-layered laminated film obtained by a process comprising laminating an acrylic resin laminated film base previously formed into a sheet or film with the thermoplastic resin melt-extruded from a T-die; and an injection molding process comprising laminating the acrylic resin laminated film with the thermoplastic resin at the same time with molding in a mold after the acrylic resin laminated film has been printed as desired on the soft layer 11 side thereof. Where any one of these processes is employed, the acrylic resin thus formed into a sheet or film maybe subjected to a corona discharge treatment for example or formed with an adhesive layer on the side to be laminated with the counterpart thermoplastic resin base.

Examples of thermoplastic resins suitable for integral molding with the acrylic resin laminated film of the present invention include polycarbonate, polyethylene terephthalate, polyethylene, polypropylene, polystyrene, polyvinyl chloride, acrylic resins, and ABS resins.

Hereinafter, the present invention will be described more specifically by way of examples, which should not be construed to limit the scope of the present invention.

Acrylic resin materials used in the following examples and comparative examples are as follows. Each of the acrylic resin materials is represented with a reference character.

(I) Acrylic Resin A

A resin comprising methyl methacrylate as a major component copolymerized with butyl acrylate (20% by weight).

(II) Triple-layered Acrylic Rubber Particles B

Particles having an average particle diameter of about 240 nm in the acrylic resin, prepared according to Example 3 of Japanese Examined Patent Gazette No. SHO 55-27576, which comprises an innermost layer formed of a crosslinked polymer polymerized using methyl methacrylate and a small amount of allyl methacrylate, an intermediate layer formed of a soft rubber elastic material polymerized using butyl acrylate as a major component, styrene and a small amount of allyl methacrylate, and an outermost layer formed of a hard polymer polymerized using methyl methacrylate and a small amount of ethyl acrylate.

(III) Triple-layered Acrylic Rubber Particles C

Particles having an average particle diameter of about 145 nm in the acrylic resin, prepared according to Example 3 of Japanese Examined Patent Gazette No. SHO 55-27576, which comprises an innermost layer formed of a crosslinked polymer polymerized using methyl methacrylate and a small amount of allyl methacrylate, an intermediate layer formed of soft rubber elastic material polymerized using butyl acrylate as a major component, styrene and a small amount of allyl methacrylate, and an outermost layer formed of a hard polymer polymerized using methyl methacrylate and a small amount of ethyl acrylate.

(IV) Double-layered Acrylic Rubber Particles D

Particles having an average particle diameter of about 75 nm in the acrylic resin, which comprises an inner layer formed of a soft rubber elastic material polymerized using butyl acrylate as a major component, styrene and a small amount of allyl methacrylate, and an outer layer formed of a hard polymer polymerized using methyl methacrylate and a small amount of ethyl acrylate.

Example 1

80 parts by weight of acrylic resin A in the form of pellet and 20 parts by weight of triple-layered acrylic rubber particles B were melt-kneaded to give a resin pellet for a hard layer. A plate-shaped test piece formed from this resin had a flexural modulus of 2,960 MPa, which was measured according to JIS K 7171. On the other hand, 34 parts by weight of acrylic resin A in the form of pellet and 66 parts by weight of double-layered acrylic rubber particles D were melt-kneaded to give a resin pellet for a soft layer. A plate-shaped test piece formed from the acrylic resin for the soft layer had a flexural modulus of 1,150 MPa, which was measured according to JIS K 7171.

The resin pellet for the hard layer was introduced into a single-screw extruder of 65 mmφ, while the acrylic resin pellet for the soft layer was introduced into another single-screw extruder of 45 mmφ. These resins were then co-extruded through a multi-layered die of the feed block type set at 255° C. so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μm.

Example 2

Pellet of acrylic resin A, per se, was used to form a hard layer. A plate-shaped test piece formed from this resin had a flexural modulus of 3,200 MPa, which was measured according to JIS K 7171. In the same manner as in Example 1 except the resin for the hard layer, the resins were co-extruded so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μm.

Example 3

Pellet of acrylic resin A, per se, was used to form a hard layer. A plate-shaped test piece formed from this resin had a flexural modulus of 3,200 MPa, which was measured according to JIS K 7171. On the other hand, 55 parts by weight of acrylic resin A in the form of pellet and 45 parts by weight of double-layered acrylic rubber particles D were melt-kneaded to give a resin pellet for a soft layer. A plate-shaped test piece formed from the acrylic resin for the soft layer had a flexural modulus of 1,200 MPa, which was measured according to JIS K 7171. Thereafter, according to Example 1, the resins were co-extruded so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μm.

Example 4

Pellet of acrylic resin A, per se, was used to form a hard layer. A plate-shaped test piece formed from this resin had a flexural modulus of 3,200 MPa, which was measured according to JIS K 7171. On the other hand, 10 parts by weight of acrylic resin A in the form of pellet and 90 parts by weight of triple-layered acrylic rubber particles C were melt-kneaded to give a resin pellet for a soft layer. A plate-shaped test piece formed from the resin for the soft layer had a flexural modulus of 1,250 MPa, which was measured according to JIS K 7171. Thereafter, according to Example 1, the resins were co-extruded so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μm.

Comparative Example 1

70 parts by weight of acrylic resin A in the form of pellet and 30 parts by weight of triple-layered acrylic rubber particles B were melt-kneaded to give a resin pellet for a soft layer. A plate-shaped test piece formed from this resin had a flexural modulus of 2,300 MPa, which was measured according to JIS K 7171. In the same manner as in Example 1 except the resin for the soft layer, the resins were co-extruded so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μm.

Comparative Example 2

70 parts by weight of acrylic resin A in the form of pellet and 30 parts by weight of double-layered acrylic rubber particles D were melt-kneaded to give a resin pellet for a hard layer. A plate-shaped test piece formed from this resin had a flexural modulus of 1,650 MPa, which was measured according to JIS K 7171. In the same manner as in Example 1 except the resin for the hard layer, the resins were co-extruded so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μm.

Comparative Example 3

Pellet of acrylic resin A, per se, was used to form a hard layer. A plate-shaped test piece formed from this resin had a flexural modulus of 3,200 MPa, which was measured according to JIS K 7171. On the other hand, 67 parts by weight of acrylic resin A in the form of pellet and 33 parts by weight of double-layered acrylic rubber particles D were melt-kneaded to give a resin pellet for a soft layer. A plate-shaped test piece formed from the acrylic resin for the soft layer had a flexural modulus of 1,550 MPa, which was measured according to JIS K 7171. Thereafter, according to Example 1, the resins were co-extruded so that the hard layer and the soft layer of the finally resulting laminated film became 10 μm thick and 115 μm thick, respectively. A laminated body in the form of film thus co-extruded was cooled in a manner to bring the both sides thereof into complete contact with polishing rolls (metal rolls). Thus, there was obtained a laminated film comprising the two different acrylic resins and having an overall thickness of 125 μtm.

Comparative Example 4

A laminated film comprising two different acrylic resins and having an overall thickness of 125 μm was obtained in the same manner as in Example 2 except that the discharge speeds of the two different resins were varied so that the hard layer and the soft layer of the finally resulting laminated film became 50 μm thick and 75 μm thick, respectively.

The laminated films obtained in the foregoing Examples and Comparative Examples were subjected to the following tests. The results of the tests are shown in Table 1.

(I) Pencil Hardness Test

The surface hardness of the hard layer of each laminated film was measured according to "8.4 Pencil scratch value" of "8. Test method related to resistance of coating film" included in "General test methods for coatings" prescribed by JIS K 5400-1990.

(II) Flexibility Test

The flexing resistance of each laminated film was evaluated according to "8.1 Flexing resistance" of "8. Test method related to resistance of coating film" included in "General test methods for coatings" prescribed by JIS K 5400-1990. A test piece evaluated to have flexibility is represented by symbol "○", while a test piece evaluated to lack flexibility due to fracture is represented by symbol "X".

(III) Whitening Test

Each laminated film was subjected to a tensile test according to "Tensile test method for plastics" prescribed by JISK7113-1995. The haze of a fractured portion of the laminated film was measured before and after the tensile test and the difference in haze was regarded as an indication of a whitening degree. The measurement of haze was conducted according to "Test method for optical characteristics of plastics" prescribed by JISK 7105-1981. From the haze $H_1$ of the laminated film before the tensile test and the haze $H_2$ of the laminated film after the tensile test, the difference in haze $\Delta H$ (=$H_2-H_1$) before and after the tensile test was found. Greater $\Delta H$ means that whitening caused by the tensile test became more conspicuous.

TABLE 1-(1)

|  | Hard Layer | | | Soft Layer | | | Rubber Content (% by weight) |
|---|---|---|---|---|---|---|---|
|  | Rubber Particle Structure | Flexural Modulus (MPa) | Thickness (μm) | Rubber Particle Structure | Flexural Modulus (MPa) | Thickness (μm) |  |
| Example 1 | Triple-layered | 2,960 | 10 | Double-layered | 1,150 | 115 | 66 |
| Example 2 | — | 3,200 | 10 | Double-layered | 1,150 | 115 | 66 |
| Example 3 | — | 3,200 | 10 | Double-layered | 1,200 | 115 | 45 |
| Example 4 | — | 3,200 | 10 | Triple-layered | 1,250 | 115 | 90 |
| Comparative example 1 | Triple-layered | 2,960 | 10 | Triple-layered | 2,300 | 115 | 30 |
| Comparative example 2 | Double-layered | 1,650 | 10 | Double-layered | 1,150 | 115 | 66 |
| Comparative example 3 | — | 3,200 | 10 | Double-layered | 1,550 | 115 | 33 |
| Comparative example 4 | — | 3,200 | 50 | Double-layered | 1,150 | 75 | 66 |

TABLE 1-(2)

|  | Pencil Hardness | Flexibility | Whitening Degree (ΔH) |
|---|---|---|---|
| Example 1 | H | ○ | 0.2 |
| Example 2 | 2H | ○ | <0.1 |
| Example 3 | 2H | ○ | <0.1 |
| Example 4 | 2H | Δ | <0.1 |
| Comparative example 1 | H | ○ | 27.0 |
| Comparative example 2 | 3B | ○ | <0.1 |
| Comparative example 3 | 2H | X | <0.1 |
| Comparative example 4 | 2H | X | <0.1 |

As apparent from Table 1, Comparative Examples 1 to 4 were each found to exhibit a decrease in surface hardness or a decrease in flexibility or to allow whitening to occur. This means that any one of these characteristics was sacrificed. In contrast, the laminated films of Examples 1 to 4 were each found to have sufficient surface hardness and flexibility and to allow a very low degree of whitening to occur due to the tensile test. Thus, the acrylic resin laminated films of these Examples are each capable of providing for a molding with less whitening during molding while maintaining a surface hardness inherent to the acrylic resin as well as ensuring sufficient flexibility.

The acrylic resin laminated film of the present invention is excellent in surface hardness, flexibility and ability to prevent whitening from occurring during molding or forming and hence is suitable for use as a surface material for moldings, such as interior materials for vehicles, exterior materials for household electrical appliances and building materials (exterior), which are obtained by a molding or forming process requiring bending or stretching.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. An acrylic resin laminated film comprising a soft layer formed of an acrylic resin incorporated with rubber particles and having a flexural modulus of about 1,300 MPa or less, and a hard layer formed of an acrylic resin having a flexural modulus of about 1,800 MPa or more on at least one side of the soft layer, wherein the hard layer has a thickness of about 0.1 to about 30 μm and a ratio of a thickness of the hard layer to the overall thickness of the laminated film is about 50% or less.

2. The acrylic resin laminated film according to claim 1, wherein the rubber particles incorporated in the soft layer are acrylic rubber particles having a double-layered structure.

3. The acrylic resin laminated film according to claim 1, wherein the rubber particles in the soft layer have an average particle diameter of about 10 to about 200 nm.

4. The acrylic resin laminated film according to claim 2, wherein a content of acrylic rubber particles having the double-layered structure in the soft layer is about 40% by weight or more.

5. The acrylic resin laminated film according to claim 1, wherein the acrylic resin forming the soft layer is a copolymer of methyl methacrylate and butyl acrylate, the rubber particles incorporated in the soft layer are acrylic rubber particles having a double-layered structure and a content of the acrylic rubber particles having the double-layered structure in the soft layer is about 40% by weight or more.

6. The acrylic resin laminated film according to claim 1, wherein the hard layer is substantially free of acrylic rubber particles.

7. The acrylic resin laminated film according to claim 1, wherein the hard layer contains acrylic rubber particles having a triple-layered structure in an amount of about 60% by weight or less.

8. A laminated molding comprising an acrylic resin laminated film according to claim 1, 2, 3, 5, 6 or 7 and a thermoplastic resin, wherein the acrylic resin laminated film and the thermoplastic resin being integrally molded such that the hard layer of the acrylic resin laminated film forms an outermost layer.

9. The laminated molding according to claim 8, wherein the acrylic resin laminated film is printed with a pattern or image on at least one side thereof.

* * * * *